Patented Aug. 22, 1933

1,923,127

UNITED STATES PATENT OFFICE 1,923,127

RELIEF VALVE

Vincent V. Veenschoten, Erie, Pa., assignor to Northern Equipment Company, Erie, Pa., a Corporation of Pennsylvania Application April 24, 1930. Serial No. 446,884

10 Claims. (Cl. 137—156)

Figure 1:
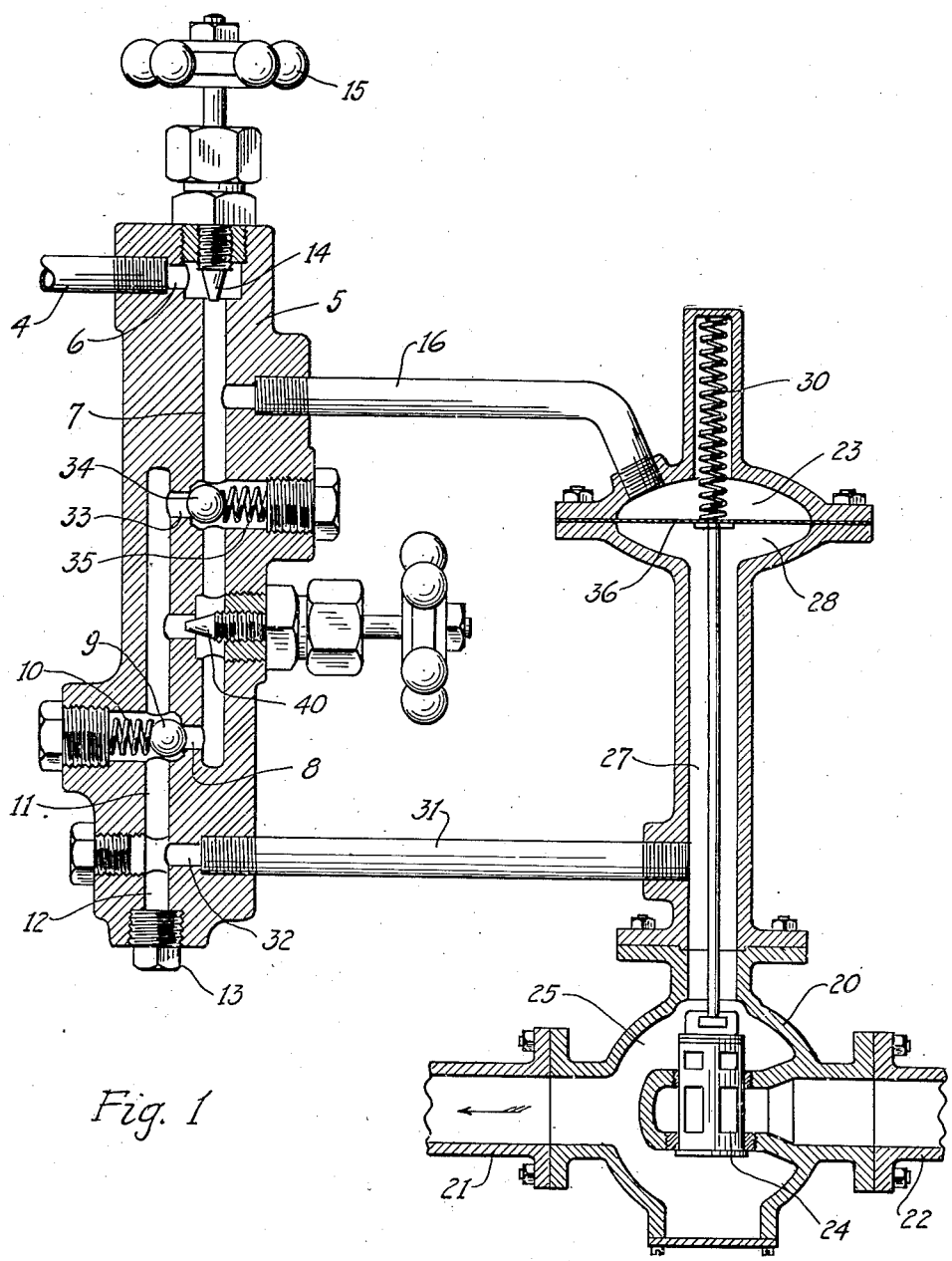
Figure 2:
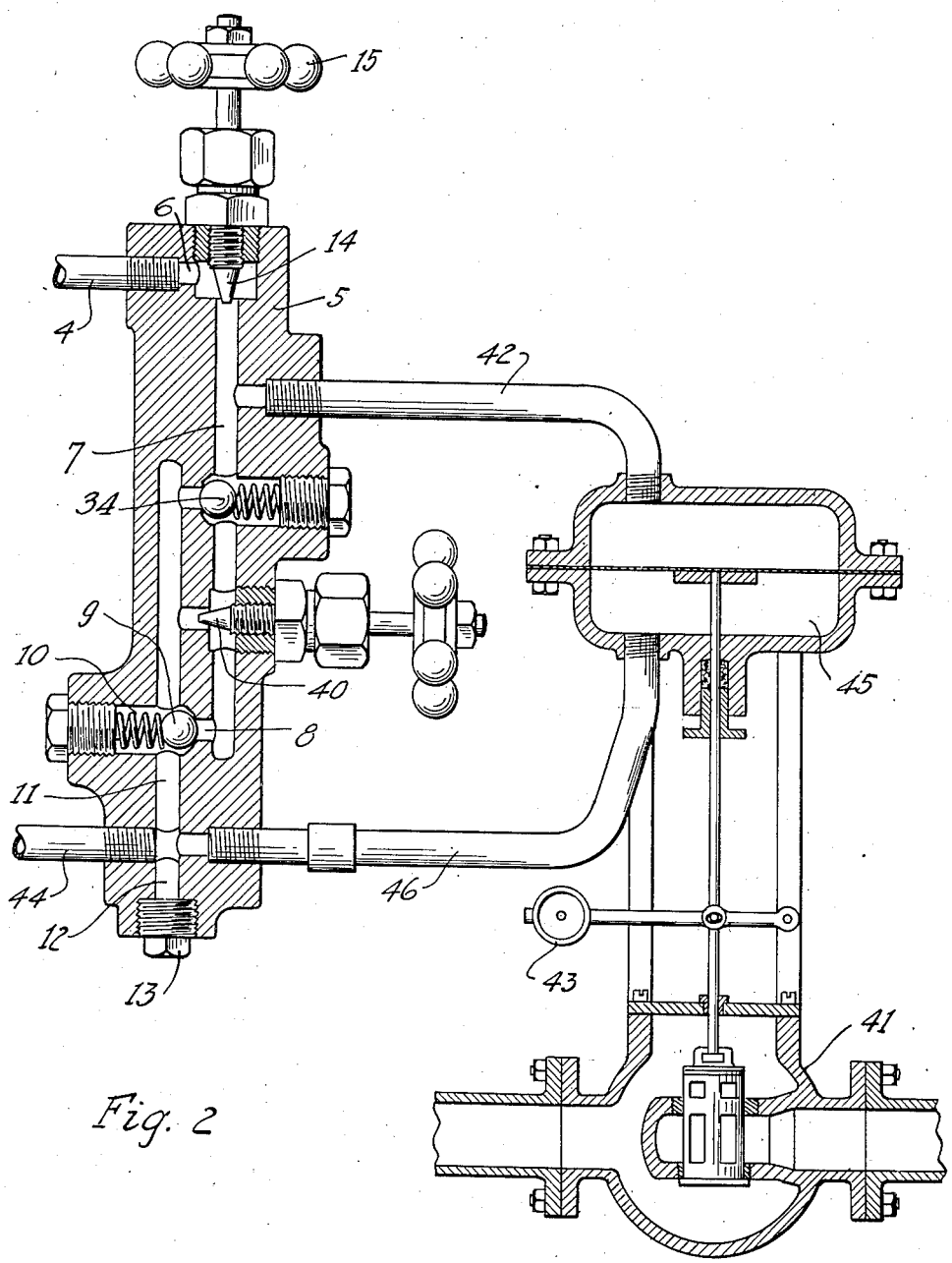

This invention relates to relief valves and particularly to such valves used in connection with apparatus, such as diaphragm controllers, operated by fluid pressures. One of the objects of the invention is to provide a relief valve which can be controlled, so as to limit the maximum pressure, and also one that reduces to a minimum the waste when the valve operates. A further object of the invention is to provide a double relief valve which properly and very sensitively controls both pressures when two fluid pressures are used to oppose each other. Other objects of the invention will be apparent from a consideration of the accompanying drawings and the following description thereof:

Of the drawings, Fig. 1 is a central sectional elevation of a relief valve, which embodies the features of my invention, applied to a diaphragm controller; and Fig. 2 is a relief valve applied to a somewhat modified diaphragm controller.

My invention is applicable to various purposes other than the preferred uses which are illustrated; and a portion only or all of the elements of the relief valve may be used as desired. The valve comprises a casting 5 which has in one end an inlet passageway 6 which is adapted to receive a pipe 4 containing a fluid under pressure. Connected with the passageway 6 are other passageways 7 and 8. In the passageway 8 is a valve 9, backed by a spring 10. In case of an excess pressure in the pipe 4, it will be seen that the valve 9 will be forced open and the fluid will be at liberty to flow into the passageway 11 and out through the outlet 12 if the plug 13 is not in use. Hence, by this arrangement, the valve acts as an ordinary relief valve.

However, partly in order to limit the amount of waste fluid, a valve 14 is provided, operated by the handle 15, which may be adjusted so as to limit the valve opening to any desired amount and, in case of the opening of the relief valve, the amount of fluid escaping will be reduced to a minimum. Also, with this control valve 14, in case of any surging of the pressure in the fluid in the pipe 4, the effect on the diaphragm 36 and on the relief valve will be largely eliminated, as the pressure in the passageway 7 will remain substantially uniform, or change slowly. It thus acts as a throttle valve to give a dash pot effect to the diaphragm chamber 23.

In operation, a pipe 16 may be in communication with the passageway 7 and the fluid pressure therein may be transmitted to any point desired.

The drawings illustrate other elements of the relief valve mounted in the casing 5, and the valve is adapted to control two fluid pressures which may be acting against each other. In Fig. 1, I have shown a diaphragm controller 60 which is such as may be used for controlling the flow of a fluid through the valve 20, the valve being connected with the fluid receiver by means of a pipe 21 and with a suitable source of fluid under pressure by the pipe 22.

To illustrate, the valve 20 may be in the water feed line to a boiler and adapted to control the pressure drop through the ordinary feed-water valve in the same pipe line. In this case, the pipe 4 is in communication with the boiler, and the steam pressure from the boiler is effective through the passageway 6, the pipe 16 and in the chamber 23 of the diaphragm. This pressure will force the valve plunger 24 downwardly and open the valve so as to allow the water to flow to the boiler.

The discharge chamber 25 of the valve is connected by the passageway 27 with the lower chamber 28 of the diaphragm. Hence, when the discharge water pressure is sufficiently great, the steam pressure will be overcome and the valve will be closed more. In use, ordinarily, some means such as a spring 30 is used to assist the steam pressure, and the pressure exerted by the spring determines the excess pressure of the discharge of the valve 20 over the pressure which is effective in the chamber 23.

In such a case, I prefer also to provide a relief valve for the water pressure in the passageway 27. For this purpose, the pipe 31 communicates with the passageway 32 in the casing 5 and, thus, with the passageways 11 and 33. In the passageway 33 is a valve 34 backed suitably by a spring 35. As a consequence of this arrangement, when the discharge pressure of the valve 20 becomes excessive, the valve 34 will be opened and the water pressure will be relieved, the water merely passing into the passageway 7 and upwardly to the boiler.

With this complete arrangement, it will be seen that the diaphragm 36 is protected from excess pressure on either side, the valve 9 protecting the diaphragm from excess pressure on the upper side, and the valve 34 on the lower side. Also, the throttle valve 14 protects the diaphragm from temporary abnormal pressures.

Associated with the passageway 7 is a valve 40 which normally, with this arrangement, is closed, so as to prevent the flow of fluid therethrough, as this would defeat the object of the invention.

But, if it is desired to neutralize or balance the fluid pressures on the opposite sides of the diaphragm, it is necessary only to open the valve 40 more or less. This allows the water to flow upwardly from the valve 20 into the passageway 7 and to increase the pressure on the upper side of the diaphragm. In such a case, the spring 30 will open the valve 20 the full width. If desired, in such a case, the valve 14 may be closed so as to prevent the escape of the excess pressure to the boiler.

Fig. 2 illustrates a somewhat similar use of the relief valve. In this case, the pressure on the under side of the diaphragm may be more or less independent of the discharge pressure of the valve controlled by the diaphragm.

To illustrate, the valve 41 may be the boiler pump governor valve. The boiler pressure acts on the upper side of the diaphragm through the pipe 42 and, assisted by a weight 43, the valve is opened. The discharge pressure of the boiler feed-water pump may be passed to the relief valve casing through the tube 44 and, thence, to the diaphragm casing 45 through the pipe 46. When the discharge pressure of the pump rises sufficiently, the valve will be closed more to maintain the desired pressure. In this case, also any excess pump discharge pressure is cared for by the valve 34, and the opposing pressures can be neutralized by opening the valve 40.

The valve 14 provides that, in case of operation of either of the relief valves 9 or 34, the pressures on the two sides of the diaphragm will be substantially balanced; at least, neither will be excessive. For instance, if pipe 4 broke, the pressure on the upper side of the diaphragm would be relieved. This would also relieve the pressure in passage 7 and valve 34 would be forced open. The fluid passing through passage 33 and passage 7 could escape through pipe 4 and probably would not produce a sufficient balanced pressure in chamber 23 except for the valve 14 which restricts the easy passing of the fluid in that direction. Or, if pipe 44 broke, the pressure would be relieved from the lower side of the diaphragm and in passage 11, causing valve 9 to open, but the restriction caused by valve 14 would prevent the pressure in passage 7 from exceeding the amount set by spring 10.

I claim as my invention:

1. A relief valve casing in combination with a diaphragm casing, said valve casing having two inlet openings and two outlet openings, and a passageway communicating with each of said openings, said diaphragm casing having a diaphragm chamber, and a diaphragm in said chamber, communicating means connecting said respective outlets with the diaphragm chamber on opposite sides of said diaphragm, means for passing a fluid under pressure into each of said inlets, and a relief valve mounted in said passageway between said outlets.

2. A relief valve casing in combination with a diaphragm casing as claimed in claim 1, in which said valve is arranged to yieldingly open away from one of said outlets, and a second relief valve is arranged to open away from the other outlet.

3. A relief valve casing in combination with a diaphragm casing as claimed in claim 1, including means for varying the size of said passageway between one inlet and the adjacent outlet.

4. A relief valve casing in combination with a diaphragm casing as claimed in claim 1, including means for varying the size of said passageway between said valves.

5. A controller having a hollow casing, a movable member mounted in said casing and providing therein two separate chambers, means for passing a fluid under pressure into each chamber, means for limiting the maximum pressure effect in one chamber, said passing means comprising a passageway communicating with each chamber, means for passing fluids under pressure into said passageway through two spaced inlets therein, said limiting means comprising a relief valve in said passageway between said inlets, and said valve opening towards one of said inlets, and a second relief valve in said passageway opening towards the other inlet.

6. A controller having a hollow casing, a movable member mounted in said casing and providing therein two separate chambers, means for passing a fluid under pressure into each chamber, means for limiting the maximum pressure effect in one chamber, said passing means comprising a passageway communicating with each chamber, means for passing fluids under pressure into said passageway through two spaced inlets therein, said limiting means comprising a relief valve in said passageway between said inlets, and means for varying the size of said passageway between one of said inlets and said chambers.

7. A valve controller comprising a diaphragm, unrestricted communicating means connecting one side of said diaphragm with the outlet of a valve to be controlled, means for passing fluid under pressure to the other side of said diaphragm, means for limiting the amount of said pressure, and means for limiting the amplitude of any vibrations of said pressure.

8. A valve controller as claimed in claim 7, including means for limiting the effects of the pressure in the outlet of said valve on said diaphragm.

9. In a controller, a casing having a diaphragm therein and a chamber on each side of the diaphragm, independent means for passing a fluid under pressure in each chamber, and means for automatically providing communication between the chambers when the pressure in either chamber exceeds that in the other a predetermined amount.

10. In a controller as claimed in claim 9, additional manual means for providing communication between said chambers.

VINCENT V. VEENSCHOTEN.